July 22, 1952 L. W. PARKER 2,604,585

FREQUENCY STABILIZED TRANSMITTER

Filed April 10, 1948

INVENTOR.
Louis W. Parker
BY
Julius E. Foster

Patented July 22, 1952

2,604,585

UNITED STATES PATENT OFFICE 2,604,585

FREQUENCY STABILIZED TRANSMITTER

Louis W. Parker, Little Neck, N. Y.

Application April 10, 1948, Serial No. 20,249

5 Claims. (Cl. 250—17)

This invention relates to high frequency radio transmitting systems, and particularly to regulating systems therefor.

The generation of high frequencies and the maintenance of those frequencies at definite fixed assigned frequency values are attended by many difficulties. The characteristics of the oscillator used as a frequency generator may vary with age, or with changes in ambient conditions. Frequency variations may be caused by variations in the parameters of the circuits or in the components through which electrical quantities of the desired frequency are conducted prior to utilization at desired locations.

A broad object of this invention is to provide a regulating system having a general application for controlling high frequencies by reducing the effects of any deviations that may occur in the system. The field of television is one in which the problem is becoming urgent to be able to limit the deviation of a high frequency from its assigned frequency value. When a carrier of high frequency is used as a vehicle for a television signal, the carrier frequency is amplitude-modulated by that signal, and is subsequently passed through a transmitter power tube.

The carrier frequency may suffer some deviations of frequency from causes within the oscillator ahead of the transmitter power tube. In addition, it also suffers an undesired frequency-changing effect from causes within the output power tube and its circuit.

While the invention as described herein is useful to reduce frequency deviations due to any cause, and in transmitters using any kind of amplitude modulation, its application is particularly advantageous to eliminate frequency-changing effects occurring in the modulated output tube of television transmitters, and is also described by way of example in relation to such a transmitter.

Such deviations or frequency-changing effects become particularly noticeable on carrier frequencies near and above 100 megacycles. They may be due to a number of causes, including, for example, the electron transit time, imperfect neutralization in the transmitter power tube, etc.

In my Patent No. 2,448,908 covering a Television Receiver, I have disclosed a novel receiving system wherein the amplitude-modulated picture carrier frequency and the frequency-modulated sound carrier of a television signal are both received in a common radio frequency section and then conducted through a common wide-band R.-F. or I.-F. amplifier channel, from which the picture carrier frequency is directly detected to derive the picture signal. The picture carrier frequency and the sound carrier frequency from that common channel are also heterodyned in the second detector to produce a beat-frequency to serve as a carrier frequency for the frequency-modulated sound signal. That frequency-modulated beat frequency carrier is frequency-detected to derive the sound signal therefrom to energize a sound reproducer.

Ordinarily, the sound carrier frequency is only frequency-modulated, and the picture carrier frequency is only amplitude-modulated. The difference or beat frequency, developed by heterodyning the picture carrier frequency and the frequency-modulated sound carrier frequency, will therefore carry the frequency modulation from the sound carrier frequency, and, upon frequency detection, will give up the sound signal.

In this application, desired frequency-modulation is specifically identified and referred to as frequency-modulation, and undesired frequency changes or deviations are referred to as frequency-changing effects.

If the picture carrier frequency, anywhere in its transit, should pick up any frequency-changing effect, that effect would be carried along and would also be transferred to the beat carrier frequency, and would be detected therefrom by the frequency discriminator just as if that frequency-changing effect were actually also part of the sound signal. Consequently a degradation of the sound signal would result. The advantages of my above described television receiver system therefore may not be fully realizable if the picture carrier frequency should be permitted to pick up any frequency-changing effects in transit and to carry them along to the receiver detector.

Those undesired frequency-changing effects become noticeable as developed in the power transmitter tube on carrier frequencies of the higher range of 100 megacycles, or above, when those higher carrier frequencies are amplitude-modulated and passed through the power transmitter tube.

A specific object of this invention, therefore, is to compensate for such undesired frequency-changing effects that are impressed upon a carrier of high frequency, when such a carrier is amplitude-modulated by a television signal, and passed through a transmitter power tube to an antenna or to an equivalent transmission system.

This invention involves a method and system wherein the nature and extent of undesired frequency-changing effects, as finally accumulated into the output of a transmitter, are measured and then fed back and added to or subtracted from the frequency ahead of the output tube in such manner as to reduce the extent of the undesired frequency-changing effects that would otherwise appear in the output of the power tube of the transmitter.

The manner in which the invention operates is illustrated in the accompanying drawings, in which.

Figure 1:
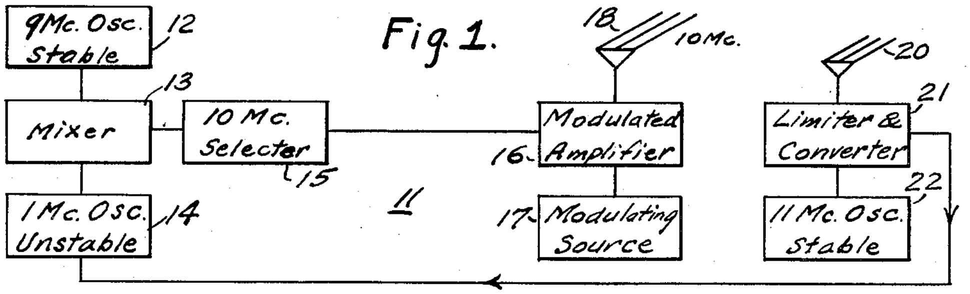
Figure 1 is a simple block diagram of a system operating with a relatively low degree of frequency regulation.

In Fig. 1, a simple diagram is shown, by way of example, of a transmitter 11, intended to operate with a carrier frequency of ten megacycles per second, and controlled in accordance with this invention, with a relatively low degree of frequency regulation. This circuit is suitable for general application to any amplitude-modulated transmitter, operating on any frequency and is not intended primarily for or restricted to use with a television receiver of the kind referred to above.

The transmitter 11 comprises a relatively stable oscillator 12, operating for the purpose of this example at nine megacycles per second, as a source of a base carrier frequency for the transmitter, a mixer 13, that is fed from the nine-megacycle oscillator 12 and from a comparatively unstable regulating oscillator 14. The regulating oscillator 14 operates at about one megacycle per second. The mixture of these two frequencies in mixer 13 provides an output containing a sum frequency which is selected by a selector circuit 15 tuned to the sum of those two frequencies.

A modulated power amplifier 16 receives the selected output frequency from the selector circuit 15 and is modulated by a signal as received from a modulating signal source 17 and that is to be transmitted on that selected frequency. An antenna 18 or other distribution system is fed by the output from the modulated amplifier 16 to transmit the signal.

The modulating signal from the signal source 17 amplitude-modulates the sum frequency supplied to the modulated amplifier 16 from the selecting circuit 15. In addition to being amplitude-modulated by the modulating signal, that sum frequency also suffers some frequency-changing effects, or deviations, from various causes within the transmitter.

The output from the power amplifier 16 therefore does not provide the accurate assigned output frequency at the transmitter and antenna 18, but contains some frequency deviation from the assigned output frequency value. The output frequency is therefore ten megacycles plus or minus the deviation.

In accordance with this invention, that signal carrier frequency as transmitted is picked up by an auxiliary antenna 20 and is supplied from antenna 20 to a limiter converter 21 which is also fed from a relatively stable oscillator 22. In this example, the frequency of stable oscillator 22 should be above the assigned frequency of the transmitter by the same amount that the base oscillator 12 is below the assigned transmitter frequency. Therefore in this example, oscillator 22 operates at eleven megacycles per second.

The output from converter 21 therefore contains the frequency of the oscillator 22 plus or minus the actual output frequency of the transmitter, but only the difference frequency, which is about one megacycle per second, is utilized for regulating control. That difference frequency controls the unstable regulating oscillator 14 to also operate at the same regulating or control frequency of about one megacycle, and the oscillator 14 feeds that regulating frequency into the mixer 13.

The operation of the transmitter may now be considered. Assuming, for example, that the frequency of the oscillator 12 might increase by 0.2 megacycle per second to 9.2 megacycles per second, the input to the selector circuit 15 would be 9.2 mc./s. plus or minus the regulating frequency F from the regulating oscillator 14. The selector 15 will pass only the frequency of $(9.2+F)$ megacycles per second.

It is assumed that selector 15 is broad enough to pass a frequency within 0.2 mc./s. of 10 mc./s. to which it is tuned. The output frequency from the transmitter to the antenna 18 will therefore be $(9.2+F)$ megacycles per second, for the purpose of this example, which assumes the deviation to be only in the oscillator 12.

That output frequency of $(9.2+F)$ mc./s. as radiated, will be picked up by the auxiliary antenna 20 and fed to the converter 21, whose output will be 11 mc./s. plus or minus $(9.2+F)$ mc./s. The regulating oscillator 14 which receives the output of converter 21 is responsive only to frequencies near 1 mc./s., and therefore responds only to the output frequency of 11 mc./s. minus $(9.2+F)$ mc./s. or $(1.8-F)$ mc./s., in the output of converter 21. By definition above, the output frequency from the regulating oscillator 14 is F. The output and input frequencies being equal in oscillator 14, $$F=(1.8-F) \text{ megacycles per second}$$
$$2F=1.8$$
$$F=0.9 \text{ mc./s.}$$

Therefore, still within this example, the output frequency of the mixer 13 is 9.2 mc./s. from oscillator 12 plus or minus 0.9 mc./s. from the regulating oscillator 14. The selector 15 is tuned to 10 mc./s. so only the sum frequency of 9.2 mc./s. plus 0.9 mc./s., or 10.1 mc./s. is accepted by selector 15 for delivery to amplifier 16.

The original or actual deviation of 0.2 mc./s. in oscillator 12 has therefore been reduced in the output antenna to half, or to 0.1 mc./s. by this invention.

Similarly if the frequency at oscillator 12 should drop to 8.8 mc./s. or 0.2 mc./s. below its intended operating frequency, the regulating system would cut the deviation effect into half, and the final output from the antenna would be 9.9 mc./s. Thus, in this arrangement of Fig. 1, the actual deviation is reduced by half, by the time it reaches the output antenna.

The foregoing examples are based on the assumption that the deviation occurs in the frequency of the oscillator 12. However, if the deviation in frequency should occur in any other part of the transmitter ahead of the antenna, the same regulating action would result, since the auxiliary or pick-up antenna 20 and the converter 21 cannot distinguish where the deviation occurred in the transmitter.

Figure 2:
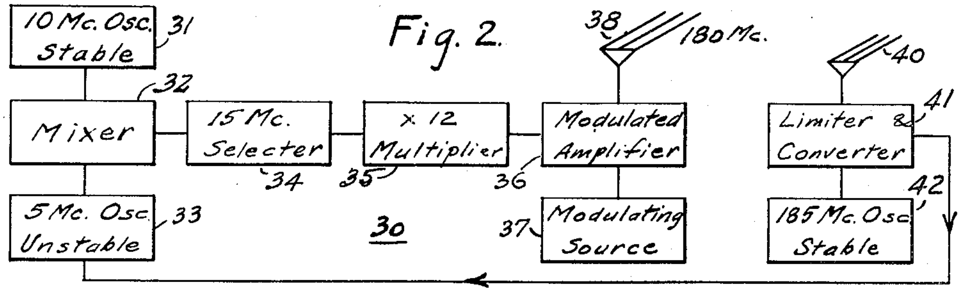
Figure 2 is a similar block diagram of a system operating with a higher degree of frequency regulation.

In Fig. 2, a circuit 30 is shown whereby a higher degree of regulation is obtainable than with the circuit of Fig. 1.

In Fig. 2, a relatively stable oscillator 31, operating at 10 mc./s., serves as a source of base carrier frequency for the transmitter. It feeds into a mixer 32 which also receives a regulating frequency from a relatively unstable regulating oscillator 33, operating at about 5 mc./s.

The sum of these two frequencies is selected from the mixer output by a selector 34 tuned to that sum of 15 mc./s. The selector output is multiplied by suitable multipliers 35 by twelve times, for example, to about 180 mc./s. That frequency is then supplied to a modulated amplifier 36, which is modulated by the signal from a modulating source 37, and the output is fed to an antenna 38.

The signal as radiated from the transmitter is picked up by an auxiliary antenna 40 and is supplied to a limiter converter 41 which is also fed from a relatively stable oscillator 42, operating at 185 mc./s. The frequency of oscillator 42 may be determined from the fact that its frequency should be above the assigned output frequency of the transmitter by the same amount as is needed to be added to the frequency of the base frequency oscillator 31 in order to establish the fundamental frequency to which the selector 34 is tuned.

In this example, oscillator 42 operates at 185 mc./s. From the output of converter 41 the difference frequency between 185 mc./s. and the transmitter output frequency is selected by the regulating oscillator 33 in the region of 5 mc./s.

In this example, for Fig. 2, assuming that oscillator 31 suffers an undesired deviation of 0.2 mc./s. and increases its frequency to 10.2 mc./s., the output of mixer 32 will be $(10.2+F)$ megacycles per second, where F again represents the regulating frequency in megacycles per second, from the regulating oscillator 33. The input frequency of regulating oscillator 33 is the same as, and is equal to the output frequency from regulating converter 41. The frequency from mixer 32 as selected by selector 34 is thus $(10.2+F)$ megacycles per second, and the transmitter output frequency is twelve times that frequency, or $12(10.2+F)$ mc./s. at antenna 38. The output from regulating converter 41 is therefore 185 minus $12(10.2+F)$ megacycles per second, which is equal to F mc./s., the output from the regulating oscillator 33.

Then $$F=185-12(10.2+F)$$
$$13F=185-122.4=62.6$$
$$F=4.815+\text{ mc./s.}$$

Without this invention, the transmitter assigned output frequency would be increased by twelve times the deviation in the oscillator 31, or $$12\times 0.2\text{ mc./s.}=2.4\text{ mc./s.}$$

By reason of the regulating action of this invention, however, the output frequency is $$12(10.2+4.815)=180.185\text{ mc./s.}$$

so that the actual deviation from assigned frequency is only 0.185 mc./s., or one-thirteenth of the expected deviation of 2.4 mc./s. at the antenna.

The multiplier 35 in Fig. 2 is conventionally used, as shown, to raise a lower crystal controlled frequency to a higher desired operating frequency.

In the process of doing this, it also multiplies any error in frequency that occurred ahead of the multiplier. This has resulted in the past in a considerable increase of the frequency error as expressed in cycles. The percentage of error however was not affected. In the present invention this increase in the number of cycles error results in a corresponding increase in the cycles of error in the beat or regulating frequency. This regulating frequency is fed back in such manner that the error in it, or the deviation from normal, is used to reduce the original error. A greater deviation from normal therefore will give greater correction. As a final result the error in the final output frequency is a smaller number of cycles than it was ahead of the multipliers and converter, in spite of the fact that the multipliers would ordinarily be expected to increase the error in the number of cycles. In the above example the original error at low frequency was 0.2 mc./s. while at the high frequency output it was only about 0.18 mc./s. This shows a slight drop in the error as expressed in the number of cycles, but the drop when expressed as a percentage of the transmitted frequency is much more noticeable, it having been reduced to 1/13 of the original percentage error.

Such good results however are not obtainable in all cases in practice. The reason is that the frequency of the oscillator which is above the assigned frequency of the transmitter and is used in generating the regulating beat frequency, is not without error. This error is also introduced into the final output frequency.

The frequency error of this higher frequency beat oscillator however is usually a constant number of cycles or its variation over a short time interval, such as one second, is so small as to be negligible. In this way frequency variations or deviations occurring at a much faster rate anywhere in the transmitter, such as frequency modulation effects, may be reduced as was stated above. This reduction is just as much as if the higher frequency beat oscillator maintained perfect frequency at all times.

Another way in which a multiplier can be used to improve frequency regulation is by multiplying the regulating frequency together with its deviation from normal.

Figure 3:
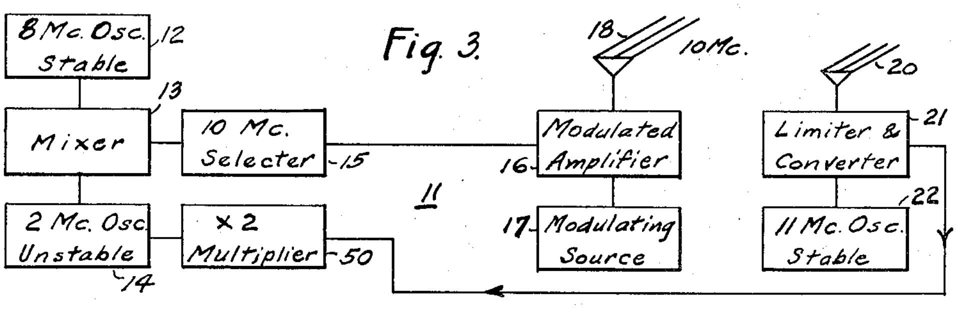
Figs. 3 and 4 are views similar to Figs. 1 and 2 modified by the addition of multipliers in the regulating circuit.

To illustrate the action of the multipliers used in that manner, the circuit of Fig. 1 is modified, as in Fig. 3, by the addition of a multiplier 50 between the output of regulating converter 21 and regulating oscillator 14. For this example and arrangement stable oscillator 22 operates at 11 megacycles per second, as before. Base frequency oscillator 12, however, operates at eight megacycles per second. Assume for this illustrative example, that base frequency oscillator 12 deviates 0.2 mc./s. and is operating at 8.2 mc./s. and supplies that frequency to mixer 13. The regulating oscillator 14 supplies a frequency F megacycles per second to mixer 13.

The output of mixer 13 as selected by selector 15 and as transmitted is $(8.2+F)$ megacycles per second, and the output from regulating converter 21 is $$11\text{ mc./s.}-(8.2+F)\text{ mc./s.}$$

and the frequency delivered to regulating oscillator 14 as input is multiplied by multiplier 50 to twice that frequency, or $$2(11-(8.2+F))\text{ mc./s.}$$

Since the output and the input frequencies of the regulating oscillator 14 are equal, output frequency $$F=2(11-8.2-F) \text{ megacycles per second}$$
$$=2(2.8-F)$$
$$=5.6-2F$$
$$3F=5.6$$
$$F=1.867 \text{ mc./s.}$$

The regulating frequency F equal to 1.867 mc./s. plus the deviated base frequency of 8.2 mc./s. equals an output frequency of 10.067 mc./s. which is less than the output frequency of 10.1 mc./s. of example one, above. The multiplier on the pick-up or regulating end has therefore also reduced the final deviation in the transmitter, similarly to the reduction of example two, preceding, with the multipliers in the transmitter proper.

Figure 4:
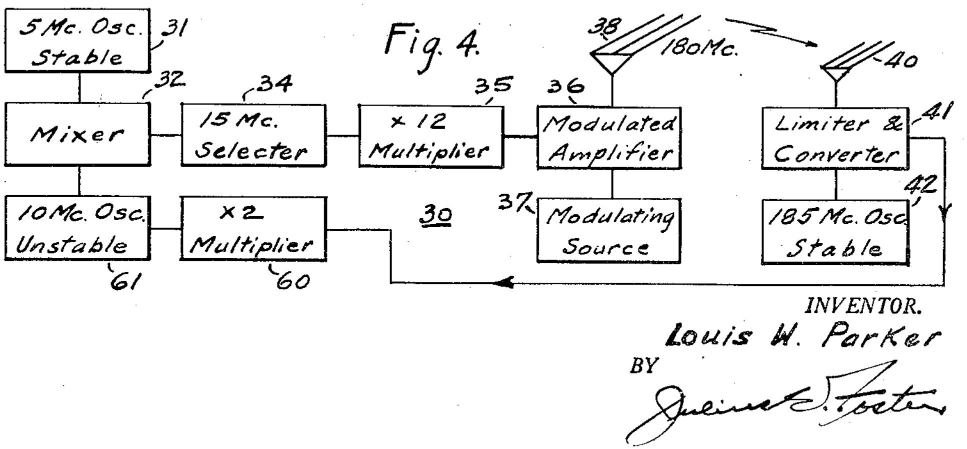

In Fig. 4 is shown an arrangement similar to that of Fig. 2, except modified by the addition of a doubling multiplier 60 following regulating converter 41, and regulating oscillator 61 operating at ten megacycles per second. Oscillator 42 operates at the same stable frequency of 185 mc./s. But the base frequency oscillator 31 is now intended to operate at five megacycles per second. Since the beat frequency from regulating converter 41 will be in the region of five megacycles and that frequency will be doubled by multiplier 60, regulating unstable oscillator 61 is intended to operate at about ten megacycles per second, so the sum frequency from mixer 32 will be about fifteen megacycles per second, to which selector 34 is tuned. Here, too, the selector is broad enough to conduct any variation or frequency-changing effect that might arise in the system.

Assuming again, for a descriptive example, the same deviation of 0.2 megacycle per second in the base frequency oscillator 31, the output from mixer 32, as selected by selector 34, is $(5.2+F)$ megacycles per second.

The output at antenna 38 is $12(5.2+F)$ mc./s. The output of regulating converter 41 will be $185-12(5.2+F)$ megacycles per second. That frequency is doubled by multiplier 60 to $2(185-12(5.2+F))$ megacycles per second, which is the input frequency to regulating oscillator 61. Since the output frequency of regulating oscillator 61 is the same and defined as F.

$$F=2(185-12(5.2+F)) \text{ mc./s.}$$
$$=370-124.8-24F$$
$$25F=245.2$$
$$F=9.808 \text{ mc./s.}$$

The final transmitted frequency is $$12(5.2+9.808) \text{ megacycles per second,}$$
$$=12(15.008)$$
$$=180.096 \text{ mc./s.}$$

In the second example above, computed on the arrangement of Fig. 2, without the multiplier 60, the final transmitted frequency was 180,185 mc./s. The use of multiplier 60 has thus reduced the deviation at the output to one-half of the deviation that would exist without the use of the multiplier 60.

In each of the examples given, the deviation was assumed in the base frequency oscillator. Where the deviation occurs closer to the transmitter output, the output deviation would be less, and the correcting effect will therefore be correspondingly smaller.

A general formula may be derived from Fig. 4.

Let $f_1$=frequency of base oscillator 31

$f_2$=frequency of beat oscillator 42

$F_t$=actual transmitter output frequency at antenna 38

$f_d$=frequency deviation in the transmitter $M$=multiplier number in the transmitter part of the circuit $kM$=multiplier number for the proportionate part of the transmitter circuit in which the deviation is multiplied, with $k$ equal to unity where the deviation is at the beginning of the transmitter circuit, in the base frequency oscillator 31

$N$=multiplier number in the regulating circuit $F$=regulating frequency to and from the regulating oscillator Then, from Fig. 4, $$(1) \quad F_t=M(f_1+F)+kMf_d$$

$$(2) \quad F=N(f_2-F_t)$$

$$(3) \quad F=Nf_2-MN(f_1+F)-kMNf_d \quad \text{(substitute (1) into (2))}$$

$$(4) \quad F+MNF=Nf_2-MNf_1-kMNf_d$$

$$(5) \quad F=\frac{Nf_2-MNf_1-kMNf_d}{MN+1}$$

The final transmitted frequency $F_t$ is equal to the value shown in Equation 1, above. Upon substituting the value of the regulating frequency F from Equation 5 into Equation 1, and reducing to the simplest form, the transmitted frequency $$F_t=\frac{Mf_1+MNf_2+kMf_d}{MN+1}$$

Applying this formula to Fig. 4, while retaining the factor $k$, $$F_t=\frac{12\times5+12\times2\times185+12kf_d}{12\times2+1}$$
$$=(180.0+0.48kf_d) \text{ megacycles per second}$$

The modifying factor for the arrangement shown in Fig. 4, as thus computed, is therefore $0.48\,kf_d$, where $f_d$ is the deviation in megacycles per second, $k$ is a proportionality factor indicating what portion of the multiplier M in the transmitter circuit is effective in multiplying the deviation effect up to the output to the antenna. Thus, when the deviation occurs at the beginning of the circuit, in the base frequency oscillator 31, the entire multiplier acts on that deviation to multiply its effect, and $k$ is then unity. The output effect is then only 0.48 times the actual deviation, where the regulating system of Fig. 4 is used. Without that regulating system, the output deviation would be twelve times the actual deviation in the oscillator, or $12f_d$, that is, twenty five times as much.

The reduction or correction factor of the system of Fig. 4 is therefore twenty-five, that is, the system reduces the deviation effect at the output to 1/25 of what it would be in the output without the regulation of this system.

Different multiplying factors may be employed, of course, and the reduction factor of the system will be correspondingly determined from Formula 6 above, as the denominator $(MN+1)$.

In Fig. 4, the frequency of beat oscillator 42 is retained at 185 mc./s., since it should be spaced sufficiently from the assigned transmitter frequency to be beyond a side band on the transmitter carrier frequency. Thus, in Fig. 4, the difference of five mc./s. is taken, between assigned frequency of 180 mc./s. and oscillator frequency of 185 mc./s., to be beyond that which would be established on the assigned frequency carrier by a video signal from the modulating source.

I claim:

1. A short wave radiation transmitter, comprising a frequency stabilized oscillator, a regulating oscillator frequency-controlled by an applied frequency, a mixer circuit energized from both oscillators to produce the sum of their frequencies, an output circuit actuated by said sum frequency, including a modulation circuit and a radiating circuit, and a frequency stabilizing circuit comprising a second stabilized oscillator, a converter circuit energized from the radiating circuit and the second oscillator to produce a beat frequency incorporating output circuit variations from the assigned frequency, said converter circuit having an output connected to the regulating oscillator arranged to apply said beat frequency as a frequency control to correct said deviations.

2. A system as set forth in claim 1, including a frequency multiplier in the output circuit.

3. A system as set forth in claim 1, including a frequency multiplier in the stabilizing circuit between the converter and the regulating oscillator.

4. A system as set forth in claim 3, including a frequency multiplier in the output circuit.

5. A system as set forth in claim 1, in which the second stabilized oscillator generates a frequency higher than the assigned frequency.

LOUIS W. PARKER.

REFERENCES CITED

The following references are of record in the file of this patent:

UNITED STATES PATENTS

| Number | Name | Date |
|---|---|---|
| 1,921,168 | Royden | Aug. 8, 1933 |
| 1,932,465 | Jensen | Oct. 31, 1933 |
| 1,953,973 | Page | Apr. 10, 1934 |
| 2,039,657 | Osborne | May 5, 1936 |
| 2,041,846 | Mathes | May 26, 1936 |
| 2,114,036 | Smith et al. | Apr. 12, 1938 |
| 2,162,883 | Foster | June 20, 1939 |
| 2,415,874 | Goldstine | Feb. 18, 1947 |